United States Patent [19]
Masutomi et al.

[11] Patent Number: 5,334,359
[45] Date of Patent: Aug. 2, 1994

[54] APPARATUS FOR PRODUCTION OF SPARINGLY WATER-SOLUBLE SALT CRYSTAL GRAINS

[75] Inventors: Haruhiko Masutomi; Hirofumi Ohtani, both of Hino; Naoko Uchida, Tokyo; Chikao Mamiya, Hachioji, all of Japan

[73] Assignee: Konica Corporation, Tokyo, Japan

[21] Appl. No.: 896,987

[22] Filed: Jun. 11, 1992

[30] Foreign Application Priority Data

Jun. 21, 1991 [JP] Japan .................. 3-150396

[51] Int. Cl.5 .............................. B01F 7/16; B01J 8/20; B01D 9/02
[52] U.S. Cl. ...................... 422/225; 422/234
[58] Field of Search ............ 422/234, 245, 225, 232, 422/233, 253; 156/DIG. 71

[56] References Cited

U.S. PATENT DOCUMENTS

| | | | |
|---|---|---|---|
| 3,145,650 | 12/1968 | Frame et al. | 96/94 |
| 3,692,283 | 9/1972 | Sauer et al. | 259/24 |
| 3,897,935 | 8/1975 | Forster et al. | 259/4 |
| 4,159,194 | 6/1979 | Steward | 422/245 X |
| 4,242,445 | 12/1980 | Saito | 430/569 |
| 4,289,733 | 9/1981 | Saito et al. | 422/225 X |
| 4,464,341 | 8/1984 | Auchadt et al. | 422/225 X |
| 4,879,208 | 11/1989 | Urabe | 430/567 X |
| 5,213,772 | 5/1993 | Ichikawa et al. | 422/245 |

FOREIGN PATENT DOCUMENTS

| | | |
|---|---|---|
| 0366181 | 5/1990 | European Pat. Off. . |
| 1472745 | 2/1972 | Fed. Rep. of Germany . |
| 2555364 | 6/1976 | Fed. Rep. of Germany . |
| 2556885 | 6/1976 | Fed. Rep. of Germany . |

Primary Examiner—Robert J. Warden
Assistant Examiner—E. Leigh Dawson
Attorney, Agent, or Firm—Finnegan, Henderson, Farabow, Garrett & Dunner

[57] ABSTRACT

An apparatus for producing sparingly water-soluble salt crystal grains, including a mixing vessel in which a cationic component solution and an anionic component solution are mixed to form a precipitation process solution in which sparingly water-soluble salt grains are produced, wherein the mixing vessel is connected to a reaction chamber through a one-way valve, and the precipitation process solution is injected into the crystal growth process solution through the one-way valve immediately after mixing while stirring the crystal growth process solution.

10 Claims, 8 Drawing Sheets

APPARATUS FOR PRODUCTION OF SPARINGLY WATER-SOLUBLE SALT CRYSTAL GRAINS

BACKGROUND OF THE INVENTION

The present invention relates to an industrially useful method for production of a monodispersed sparingly water-soluble salt with very uniform intragranular composition and ultrafine grains of sparingly water-soluble salt, and a production apparatus therefor.

In recent years, fine grains have drawn attention in various fields. Among such fine grains are photographic emulsions, which have relatively long been known.

Silver halide grains for photographic emulsion are usually produced by reaction of an aqueous solution of silver salt and an aqueous solution of halide in an aqueous solution of colloid in a reactor. Known methods include the single jet method, in which an aqueous solution of silver salt is added to a protective colloid solution such as gelatin containing an aqueous solution of halide in a reactor while stirring the latter solution, and the double jet method, in which an aqueous solution of halide and an aqueous solution of silver salt are separately and simultaneously added to an aqueous solution of gelatin in a reactor. The double jet method offers silver halide grains with narrower grain size distribution and allows free alteration of the halide composition of grains according to their growth.

Also, the speed of growth of silver halide grains is known to vary widely depending on the silver ion (halide ion) concentration, silver halide solvent concentration, grain suspension density, grain size and other factors of the reaction solutions. In particular, locally uneven distribution of solution density, which occurs in the stage of transition to uniform concentration of the aqueous solution of silver salt and aqueous solution of halide added to the reactor, leads to unevenness in the composition and grain size of the resulting silver halide emulsion as a result of changes in silver halide grain growing speed depending on the concentration of each solution. To eliminate this after-effect, it is necessary to rapidly and uniformly mix the aqueous solution of silver salt and aqueous solution of halide supplied to the aqueous solution of colloid in the reactor in reacting them. In the conventional method, in which an aqueous solution of halide and an aqueous solution of silver salt are added onto the surface of an aqueous solution of colloid in the reactor, halogen ion and silver ion concentrations become relatively high somewhere in the vicinity of the site of addition of each reaction solution, which hampers formation of uniform silver halide grains. Known means of improving this local unevenness of concentration include the methods disclosed in U.S. Pat. Nos. 3,415,650 and 3,692,283 and British Patent No. 1,323,464. These methods are characterized in that an oblate barrel-like mixing vessel, having a discharge slit in the central maximum diameter portion thereof and an opening in at least one of the upper and lower portions thereof, is immersed in an aqueous solution of colloid filled in a reactor so that the axis of rotation thereof is in the vertical direction, an aqueous solution of halide and an aqueous solution of silver salt are supplied from the upper or lower opening to the mixing vessel rotating at high speed through a supply tube, rapidly mixed and reacted therein, and the silver halide grains formed are discharged into the aqueous solution of colloid in the reactor by the centrifugal force produced by rotation of the mixing vessel.

On the other hand, Japanese Patent Examined Publication No. 10545/1980 discloses a method of preventing uneven growth by improving local unevenness of concentration. This method is characterized in that a mixing vessel, having openings in each of the upper and lower portions thereof, is sunken in a reactor filled with an aqueous solution of colloid, an aqueous solution of halide and an aqueous solution of silver salt are supplied thereto from the lower opening through respective supply tubes, the reaction solutions are rapidly stirred and mixed by a lower impeller (turbine blades) of the mixing vessel to form silver halide, and the resulting silver halide grains are immediately discharged from the upper opening of the mixing vessel into the aqueous solution of colloid in the reactor by an upper impeller provided above the lower impeller.

Japanese Patent Publication Open to Public Inspection (hereinafter referred to as Japanese Patent O.P.I. Publication) No. 92523/1982 discloses a method using the same mixing vessel as above, wherein an aqueous solution of halide and an aqueous solution of silver salt are separately supplied from the lower opening, the reaction solutions, diluted with an aqueous solution of colloid, is rapidly stirred and mixed by the lower impeller and immediately subjected to rapid shearing mixing in the space between the inner wall of the mixing vessel and the blade ends of the impeller and discharged upward, and an apparatus therefor.

However, in the production methods and apparatuses described above, although local unevenness of silver ion and halogen concentrations in the reactor can be perfectly eliminated, such unevenness remains in the mixing vessel; a dense portion is fairly widely distributed particularly in the vicinities of the nozzles via which the aqueous solution of silver salt and that of halide are supplied, in the space under the impeller and in the stirring portion. Further, the silver halide grains supplied with protective colloid to the mixing vessel rapidly grow in different modes in the portions with uneven distribution of concentration. In other words, in these production methods and apparatuses, uneven distribution of concentration is present in the mixing vessel, where grain growth occurs rapidly, which distribution of concentration does not ensure the even growth of silver halide.

With the aim of eliminating such uneven distribution of silver ion and halide ion concentrations by improved mixing, attempts have been made to supply an aqueous solution of silver salt and an aqueous solution of halide to a mixing vessel separate from a reactor and rapidly mixed to form silver halide grains. For example, Japanese Patent O.P.I. Publication No. 37414/1978 and Japanese Patent Examined Publication No. 21045/1973 each disclose a production method wherein an aqueous solution of protective colloid (containing silver halide grains) in the reactor is circulated by a pump from the bottom of the reactor, an aqueous solution of silver salt and an aqueous solution of halide are supplied to a mixing vessel which is provided in the circulatory system, and rapidly mixed therein to grow silver halide grains, and an apparatus therefor. U.S. Pat. No. 3,897,935 discloses a method wherein an aqueous solution of halide and an aqueous solution of silver salt are injected by a pump to a circulatory system of the same embodiment as above. Japanese Patent O.P.I. Publication No. 47397/1978 discloses a production method wherein an aqueous solution of alkali metal halide is first injected to a circulatory system of the same embodiment as above and allowed to diffuse until it becomes uniformly distributed, and subsequently an aqueous solution of silver salt is injected to the circulatory system and mixed with the former aqueous solution, and an apparatus therefor. Although these methods permit separate control in the flow rate of solution from the reactor to the circulatory system and the stirring efficiency of the mixing vessel and allow grain formation with uniform supply rate per previously formed silver halide grain, the problem remains unsolved that silver halide crystals grow rapidly at the injection ports for the aqueous solution of silver salt and the aqueous solution of halide.

In addition, the grains passing a portion of aqueous solution of silver salt localized in the initial stage of mixing, will form so-called silver bodies which are covered with silver ion, while those passing a portion of aqueous solution of halide will form so-called halogen bodies which are covered with halogen ions. The grains undergoing cycles of these processes involve a group of grains having different intergranular latency characteristics, involving differences in properties such as intracrystalline lattice defects, the number of transition lines and appearance of crystals.

Also, solely to avoid surrounding the resulting silver halide grains by an uneven distribution of silver ion and halide ion concentrations, it is possible to grow crystals from previously prepared silver halide grains having the same latent character within the acceptable range, by Ostwald ripening. Such methods include those disclosed in Japanese Patent O.P.I. Publication Nos. 65925/1973, 88017/1976, 153428/1977 and 99751/1987 and J. Col. Int. Sci., 63 (1978) No. 1, p. 16, and P. S. E. 28 (1984), No. 4, p. 137. When Ostwald ripening is practically used, the speed of grain growth to grown grains is high in the small size of the grains dissolved and reprecipitated. The methods described above however, are not practical because of high production cost and poor productivity. The speed of Ostwald ripening is so slow that much time is consumed in growing silver halide grains because the silver halide grains added are not sufficiently smaller than the silver halide grains to be grown.

As a means of forming fine silver halide grains, T. H. James cites the Lippman emulsion as fine grains "The Theory of the Photographic Process", 4th edition, specifying an average size of 0.05 μm. Also, Japanese Patent O.P.I. Publication Nos. 183417/1989 and 183645/1989, W089-06830 and W089-06831 and other publications disclose methods wherein fine silver halide grains are formed in a mixing vessel provided outside the reactor and immediately supplied to the reactor, where crystals are grown (see FIG. 6).

The method disclosed in Japanese Patent O.P.I. Publication No. 183417/1989 is characterized in that an aqueous solution of silver salt, an aqueous solution of colloid and an aqueous solution of halide are simultaneously supplied to a mixing vessel provided outside the reactor to form fine grains, which are immediately supplied to the reactor, where crystals are grown. This method offers very uniform silver halide because the grains during crystal growth do not come in contact with the aqueous solution of silver salt and the aqueous solution of halide.

In this method, based on a crystal growing method by supplying fine grains which has long been known in the photographic industry, the dissolution of fine grain is the rate determining factor, posing a problem of extended production time; however, short time grain growth is possible by adding the grains prepared in the mixing vessel while they remain very fine.

Figure 6:
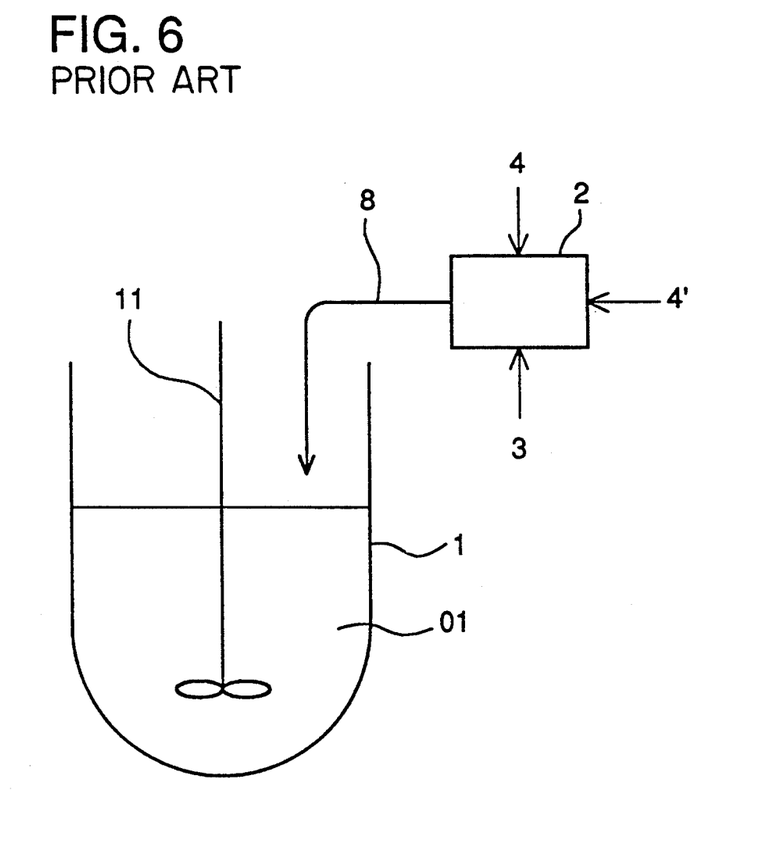
FIG. 6 is a schematic diagram of a conventional production apparatus.

However, as is evident from FIG. 6, grain formation is never instantaneous because the grains are supplied from a mixing vessel provided outside the reactor, though grain formation is faster than with pre-formed fine grains. As is known well from "Photographic Science and Engineering", Vol. 23, No. 2 118 (1979), for instance, the silver halide reaction proceeds too rapidly. As described in this publication, even in the reaction of silver chloride, which is recognized as of relatively slow reaction, at a concentration of as low as about $10^{-4}$ mol/l, the reaction completes itself in a few dozen to a few hundred msec. Therefore, even this method encounters the growth of the fine grains formed. This remains in the range of conventional grain growth from fine grains; more time is required to form grains in comparison with the double jet method. Changes in solubility product, an index of solubility of silver halide, are shown below.

TABLE 1

| Temperature (°C) | Effects of temperature on solubility product | | |
|---|---|---|---|
| | Silver chloride | Silver bromide | Silver iodide |
| 0 | $1.48 \times 10^{-11}$ | $2.03 \times 10^{-14}$ | $1.30 \times 10^{-18}$ |
| 10 | $4.35 \times 10^{-11}$ | $8.11 \times 10^{-14}$ | $7.65 \times 10^{-18}$ |
| 20 | $1.14 \times 10^{-10}$ | $2.70 \times 10^{-13}$ | $3.89 \times 10^{-17}$ |
| 30 | $2.76 \times 10^{-10}$ | $8.50 \times 10^{-13}$ | $1.74 \times 10^{-16}$ |
| 40 | $6.22 \times 10^{-10}$ | $2.44 \times 10^{-12}$ | $6.95 \times 10^{-16}$ |
| 60 | $2.57 \times 10^{-9}$ | $1.58 \times 10^{-11}$ | $8.01 \times 10^{-15}$ |
| 80 | $8.39 \times 10^{-9}$ | $7.46 \times 10^{-11}$ | $6.61 \times 10^{-14}$ |
| 100 | $2.35 \times 10^{-8}$ | $2.86 \times 10^{-10}$ | $4.01 \times 10^{-13}$ |

This table shows that solubility decreases in the descending order of silver chloride, silver bromide and silver iodide; in any case, solubility decreases as temperature declines. Also, reaction rate decreases in the descending order of silver iodide, silver bromide and silver chloride; silver chloride is slowest.

Therefore, this method requires a long time for producing silver iodobromide for high-sensitivity emulsion.

Furthermore, in regard to sparingly water-soluble salt usable in the photographic field, the following are well known as a sensitivity speck substance for silver halide grains: silver sulfide, gold sulfide and gold and/or silver chalcogenides of sulfur. These substances are known to be formed in the course of sulfur sensitization, gold-sulfur sensitization, gold sensitization, etc., respectively.

Electron microscopic observation of silver sulfide resulting from chemical sensitization of a silver halide emulsion has been reported, for example, by G. C. Furnell, P. B. Flint and D. C. Berch [Journal of Photographic Science, 25, 203 (1977)]. As reported in these reports, the size of fine grains of silver sulfide is very small of the order of several Å to a few dozen Å, and they are abundantly present on a silver halide grain surface.

A basic photographic science technical approach to obtainment of fine grains of high-sensitivity emulsion is to increase photon efficiency in the light exposure process. Factors which possibly hamper the increase in the photon efficiency include the presence of competitive electron traps originating from re-bonding, latent image dispersion, structural failure and other origins. Sulfur sensitization and gold-sulfur sensitization are thought to provide the electron capturing center in the light exposure process; therefore, it is a key to chemical sensitizing treatments to adjust the size, position and number of sensitivity specks serving as such sensitization centers. Methods of controlling this position and number are reported or proposed in Japanese Patent O.P.I. Publication Nos. 9344/1986, 40938/1989, 62631/1989, 62632/1989, 74540/1989, 158425/1989, 34/1990 and 298935/1990 and other publications.

However, all these methods aim at limiting the position of formation of the silver sulfide or gold-silver complex sulfide described above; their size and number depend on the limited position (area), with no direct control of the size or number of specks of silver sulfide, gold sulfide or complex thereof.

This is because the grains are as fine as several Å to a few dozen Å as stated above, and because the size and number are significantly affected by the site and area of formation of silver sulfide on the silver halide crystal surface.

On the other hand, some methods have been proposed which are based on techniques different from those of ordinary chemical sensitization.

For example, Japanese Patent O.P.I. Publication No. 93447/1986 describes a sensitizing method wherein not more than $10^{-3}$ mol/mol AgX of fine grains of silver sulfide or gold sulfide are formed at specific points of silver halide crystals, but it gives no specific description about the size or number thereof.

Japanese Patent O.P.I. Publication No. 198443/1990 describes sensitization of silver halide grains by the addition of silver sulfide zol having a fine grain size thereto. However, this publication gives no description of the grain size of the silver sulfide zol obtained, describing nothing other than the luminescence spectrum of the silver sulfide zol. Nor is specified the grain size distribution. As recognized commonly, coloring with colloid grains is largely affected by the size, chemical species and surface condition thereof; it is impossible to specify the size and distribution of colloid grains solely by the spectrum thereof. Therefore, when this method is used, it remains unknown how many specks have been formed on the silver halide crystal because the grain size is unknown.

As stated above, despite the fact that the size and number of fine grains of silver sulfide, gold sulfide, etc. on silver halide crystals are critical factors in the photo sensitizing process, they remain out of control. This is because their size is too small; to date, no one has ever succeeded in controlling the size and number of these grains.

However, with respect to ultrafine grains of gold and/or silver chalcogenide, no records are available even on their size, as stated above, nor has anyone attempted to produce monodispersed grains with narrow distribution. Although the above-mentioned Japanese Patent O.P.I. Publication No. 198443/1990 may be mentioned as a rare case associated with such grains, even this publication does not specify the grain size. Moreover, it describes nothing more than very unclear grain formation conditions, e.g., instantaneous addition of silver nitrate to an aqueous solution of sodium sulfide, followed by addition of an inhibitor. In view of these circumstances, the inventors analyzed various methods which had long been employed for production of silver halide grains, and found a useful combination of essential requirements with more consideration. Specifically, the essential requirements are to integrate or divide the resulting chalcogenide grains to unit aggregates of sensitization specks, to provide solution conditions ensuring atomic arrangement for sensitization specks without causing excess dissolution or decomposition of the unit aggregates, and to prevent excess flocculation of the unit aggregates to ensure stable dispersion, i.e., to use a protective colloid, to control ion concentration during grain formation, and to employ a reaction apparatus capable of controlling temperature and the amount of addition and performing instantaneous mixing. The inventors made investigations as to these items and succeeded in controlling the grain size of ultrafine grains and achieving monodispersion as described above.

When monodispersibility is required for the present invention, it is possible to keep the coefficient of variance below 0.16, as defined as the value obtained by dividing the standard deviation S of grain size by the mean grain size r.

However, with respect to apparatuses and methods for production, a problem of much time requirement remained to be solved in producing perfectly uniform ultrafine grains in a short time as with silver halide grains.

SUMMARY OF THE INVENTION

It is an object of the present invention to provide an industrially useful method of producing monodispersed sparingly water-soluble salt crystal grains having very uniform intragranular composition and ultrafine grains of difficultly soluble salt, and an apparatus therefor. More specifically, the present invention provides a method of producing very fine silver halide grains and silver halide grains with very uniform intragranular composition, and an apparatus therefor. It is another object of the present invention to provide a method of producing said fine grains wherein fine grains of gold and/or silver chalcogenide with controlled grain size are previously formed, which are then adsorbed and fixed to silver halide grains to give a chemical sensitizing effect, and an apparatus therefor.

The objects described above can be accomplished by a method of producing difficultly soluble salt crystal grains wherein a precipitation reaction solution for instantaneous mixing by vigorous stirring of a cationic component solution and an anionic component solution for the difficultly soluble salt, and a crystal growth phase solution for crystal core formation and/or crystal growth for the difficultly soluble salt crystal, are allowed to flow at a close distance solely via a means of preventing the crystal growth phase solution from entering the precipitation reaction solution, the two seed component solutions are instantaneously mixed, subsequently the precipitation reaction solution is immediately discharged into the crystal growth phase solution being vigorously stirred, and the resulting liquid phase is immediately uniformized by vigorous stirring, and an apparatus therefor.

The use of this method makes it possible to prepare fine grains of silver halide and gold and/or silver chalcogenide, which are difficultly soluble salts, in optionally selected size, which grains have a perfectly uniform intragranular composition and can be formed in almost the same time as with the ordinary double jet method.

DETAILED DESCRIPTION OF THE PREFERRED EMBODIMENT

The present invention is hereinafter described in detail.

As stated above, in the method using fine grains to grow crystals, dissolution speed increases and grain production can be completed in a shorter time as the size of the fine grains used decreases, Although the method disclosed in Japanese Patent O.P.I. Publication No. 183417/1989, wherein grains are immediately added to the reactor after formation thereof, is effective in eliminating unevenness due to ion supply, a drawback of conventional methods of grain growth, it does not meet the requirement of grain formation in a short time as realized in the conventional methods.

As an improvement in this method, the apparatus disclosed in Japanese Patent O.P.I. Publication No. 167818/1990 is characterized in that the fine grains formed in the mixing-vessel are supplied to a mixer through a piping, diluted and mixed with a solution drawn from the reactor and then returned to the reactor. The mixer is specified as a static mixing vessel. However, even this method remains unchanged as to the above-mentioned problem, since the solution in the reactor is recycled and supplied via a long piping. Specifically, the growth in the fine grains occurs during solution supply from the mixing vessel to the reactor or mixer; the grain growth is accelerated when the reaction solution supply rate is high or when the density of the silver halide grains is high. In addition, when fine silver iodobromide grains are used to grow silver iodobromide grains, it is necessary to supply particularly fine grains, since the growth rate of silver iodobromide is slow.

Figure 5:
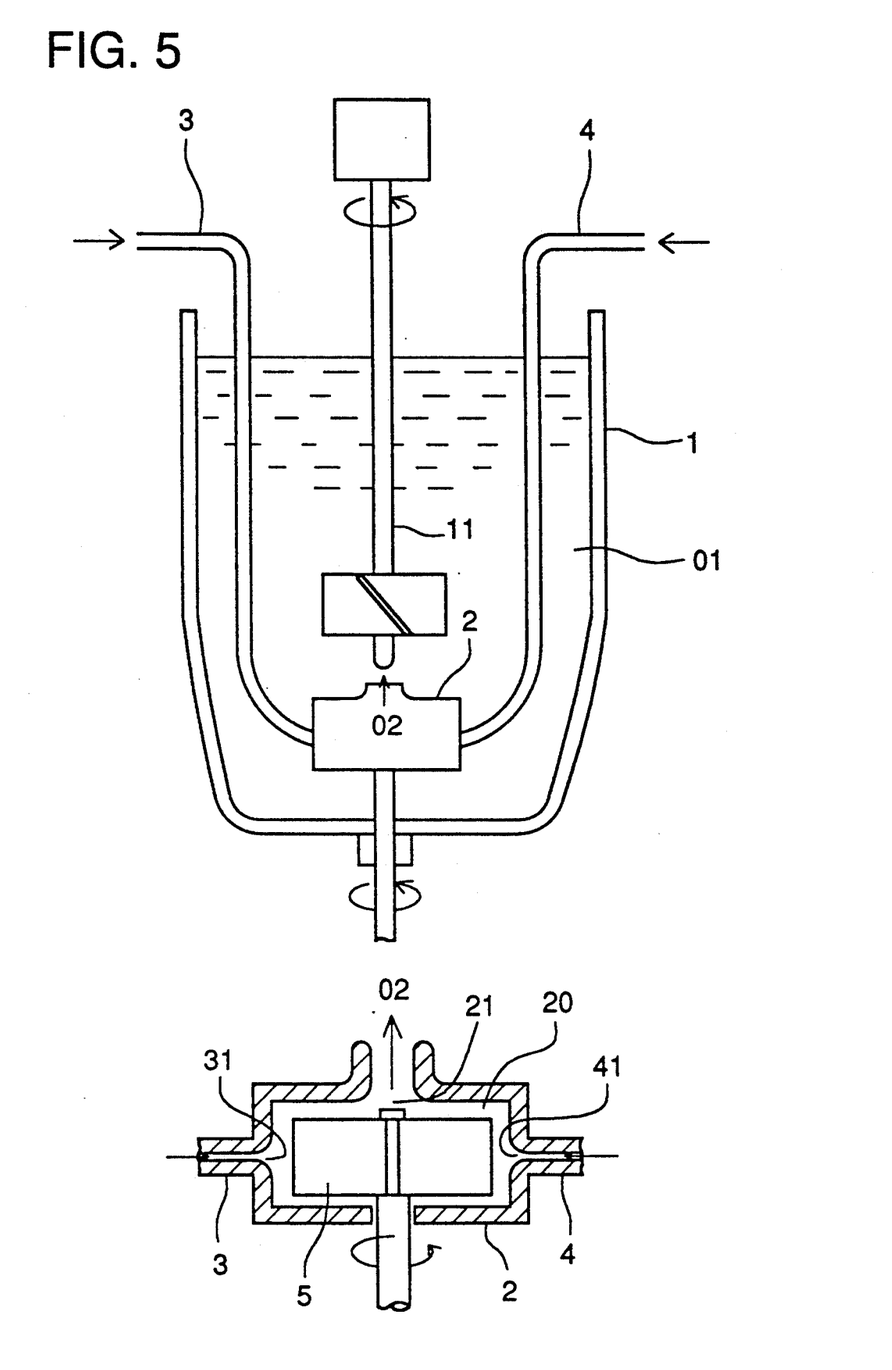
FIG. 5 is cross-sectional views of a production apparatus and mixing vessel used in the examples of the present invention.

In view of these circumstances, the present inventors first took note of a method wherein the precipitate is instantaneously added to grown grains without giving the precipitate the time to grow after precipitation thereof, immersing a mixing vessel 2 in a reactor 1, as illustrated in FIG. 5. The precipitate thus formed was expected to be instantaneously mixed in the grown grains after precipitation thereof.

It was unexpectedly found, however, that small grains remain when the formation time is equal to that for the double jet method. The inventors made further analysis and trials associated with this phenomenon, and found that instantaneous grain growth or uniform mixing with core grains is necessary in addition to instantaneous addition of the precipitate.

The objects of the present invention, then, cannot be accomplished unless the following three requirements are all met:

(1) the component solutions involved in the precipitation reaction must be instantaneously vigorously mixed with no contact with crystal cores and/or grown grains, (2) the resulting precipitate must be immediately added to the crystal cores and/or grown grains without giving it the time to grow, and (3) the precipitate supplied must be instantaneously uniformly dispersed in the crystal growth phase solution. In other words, the method of production according to the present invention described above is essential.

The method of the present invention is clearly different from the double jet method, i.e., the component solutions do not come in contact with the crystal cores and/or grown grains, and the crystal growth phase solution has substantially no localized portion of the component solutions, whether or not it is dense. However, the two methods appear nearly the same as each other with respect to precipitate morphology.

For this reason, stirring strength which is at least equal to that obtained with a stirring mixer developed for the double jet method is essential.

The essential difference from Japanese Patent O.P.I. Publication Nos. 183417/1989 and 167818/1990 and other publications is that the three requirements described above must be met.

The production apparatus for the production method of the present invention is available in two types according to the embodiment of the mixing vessel.

The first type is characterized as follows.

A reactor, equipped with a heavy duty mechanical stirrer, is filled with a crystal growth phase solution, in which a protective colloid substance is contained, for crystal core formation and/or crystal growth of difficultly soluble salt crystals, and a mixing vessel, having slit openings for respective injection of a cationic component solution and an anionic component solution of the difficultly soluble salt and having a reaction chamber for precipitation reaction equipped with a heavy duty mechanical stirrer for mixing the two component solutions, are communicated in a single construction so that the two phase solutions flow at a close distance solely via a back flow preventing valve for preventing the crystal growth phase solution from entering the precipitation reaction phase solution, wherein the precipitation reaction phase solution is discharged into the crystal growth phase solution being vigorously stirred.

The second type is characterized as follows.

Figure 1:
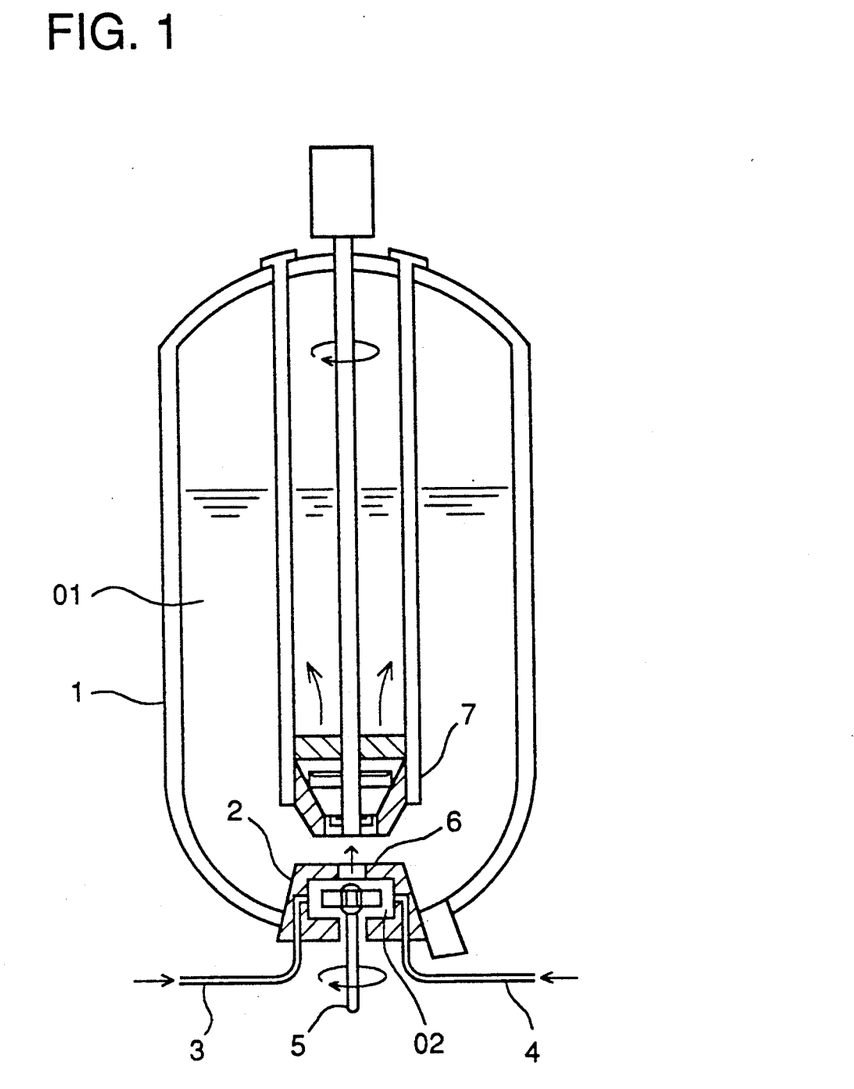
FIG. 1 is a schematic diagram of a production apparatus according to the present invention.
Figure 2:
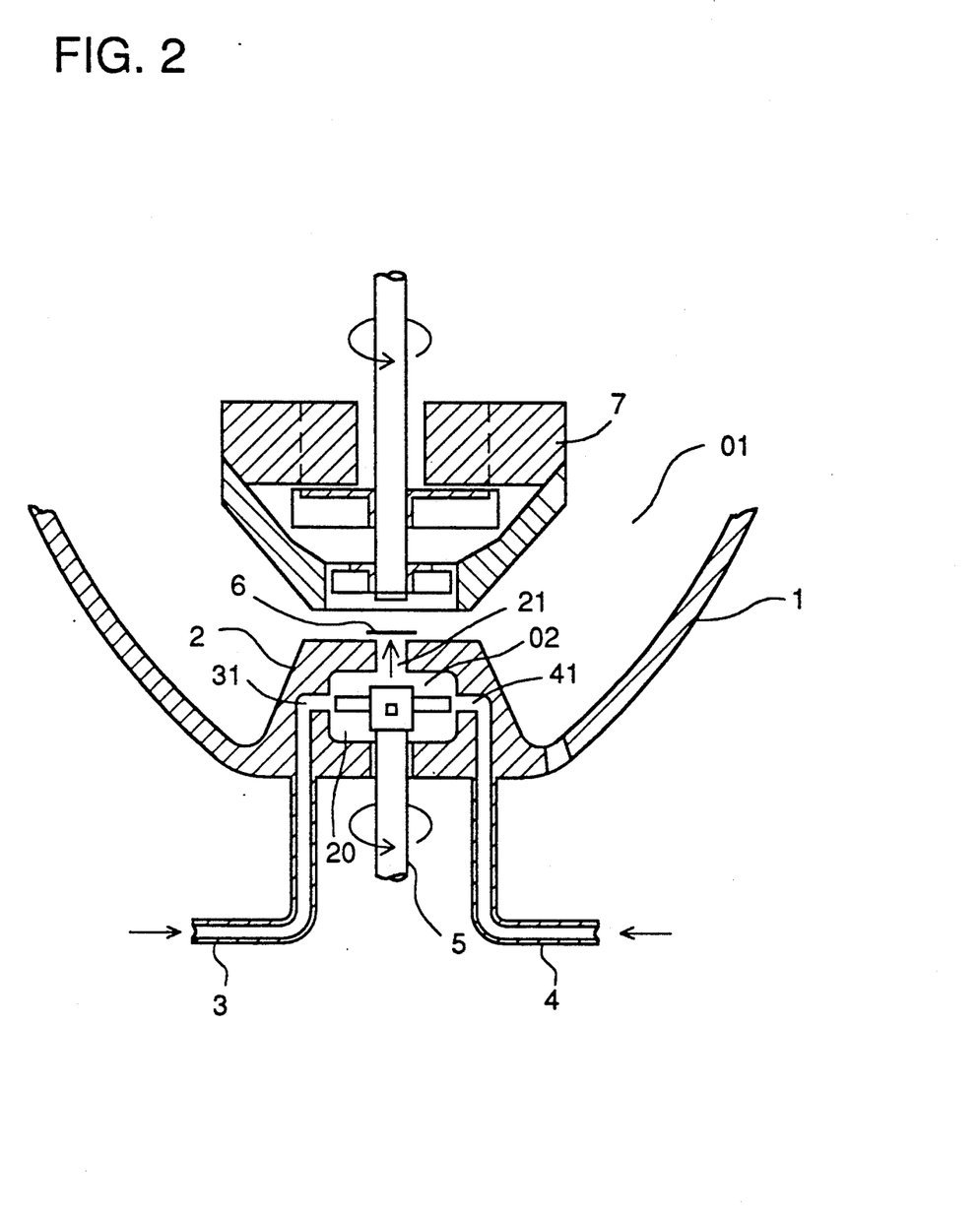
FIG. 2 is a magnified view of the mixing vessel of the apparatus of FIG. 1.

A mixing vessel, located outside a reactor, is connected to the reactor via a circulatory piping for circulation of the crystal growth phase solution, the circulatory piping being unified into the mixing vessel along the reaction chamber. Examples of an embodiment of a production apparatus of type 1 are shown in FIGS. 1 and 2.

In the two figures, the numerical symbol 1 is a reactor, 01 is a crystal growth phase solution, 2 is a mixing vessel, 20 is a reaction chamber, 02 is a precipitation reaction phase solution, 21 is a discharge slit for solution 02, 3 and 4 are component solution supply pipings, 31 and 41 are slit openings for supply pipings 3 and 4 to the reaction chamber, 5 is a heavy duty mechanical stirrer attached to reaction chamber 20, 6 is a back flow preventing valve preventing solution 01 from entering solution 02, 7 is a heavy duty mechanical stirrer for immediate uniform mixing of discharged solution 02 to solution 01, which is provided near the discharge slit to increase mixing efficiency.

Figure 3:
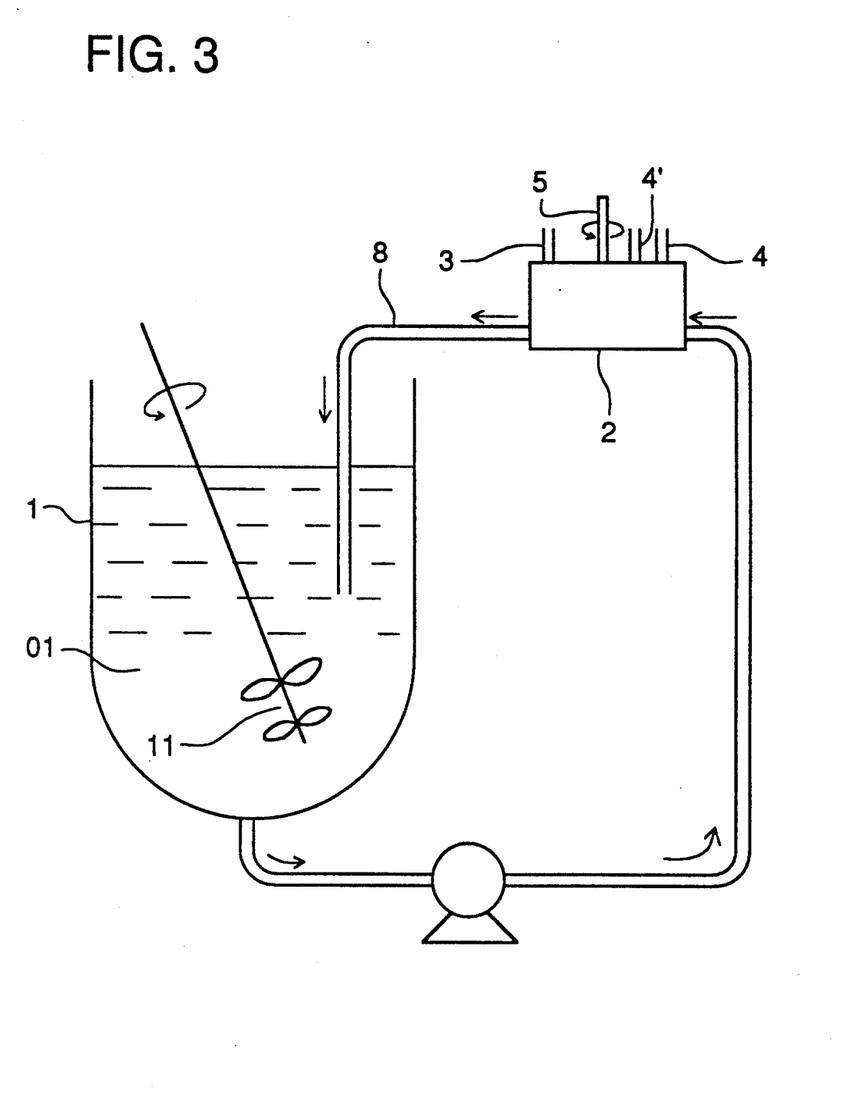
FIG. 3 is a schematic diagram of another production apparatus according to the present invention.
Figure 4:
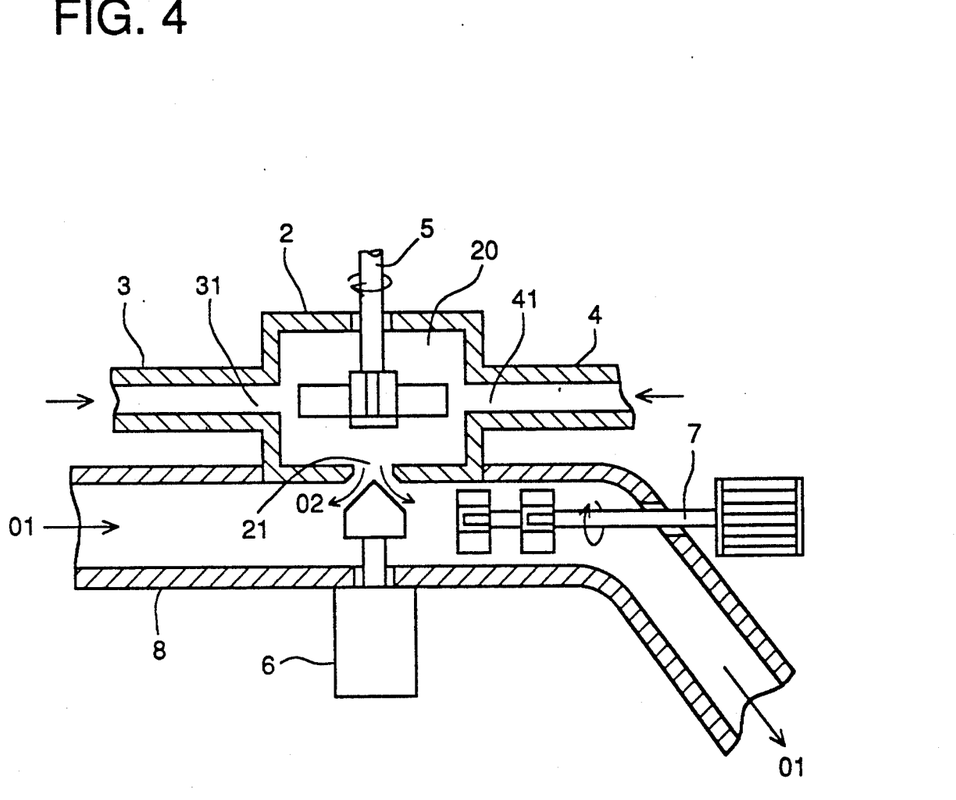
FIG. 4 is a magnified view of the mixing vessel of the apparatus of FIG. 3.

Examples of embodiment of a production apparatus of the type 2 are shown in FIGS. 3 and 4. The numerical symbols also used in FIGS. 1 and 2 have the same definitions as those specified therein; 11 is a mechanical stirrer for solution 01, and 8 is a circulatory piping connecting reactor 1 and mixing vessel 2. Circulatory piping 8 runs at a close distance to reaction chamber 20 via the back flow preventing valve 6 alone. Solution 02 discharged from discharge slit 21 into solution 01 in circulatory piping 8 is immediately uniformly mixed by heavy duty mechanical stirrer 7 to yield fresh solution 01, which returns to reactor 1.

Thus, the liquid phase of the crystal growth phase solution undergoes changes upon mixing of the precipitation reaction phase solution containing the precipitate, i.e., crystal cores effective on the formation of sparingly water-soluble salt crystals are formed or crystal grains grow.

When solution 02 is discharged in multiple stages, crystal grain growth follows formation of crystal cores. Further, changing the composition of solution 02 for each step facilitates formation of grains with multiple-layer structure.

Heavy duty mechanical stirrer 7 is located substantially on the contact point of the mixing vessel and the circulatory piping. Here, it is to be understood that "substantially" affords the presence of a means of stirring in the upstream of the contact point. This is because a means of stirring provided in the upstream produces a strong turbulence flow before addition of solution 02 to thereby facilitate instantaneous mixing. Details are hereinafter described by item.

The same as with production of silver halide applies to silver sulfide, gold-silver sulfide, gold sulfide and selenide and telluride of sulfide. Silver halide is taken as an example.

Mixing vessel

To rapidly mix an aqueous solution of silver salt, an aqueous solution of halide, and, where necessary, an aqueous solution of protective colloid, to yield fine grains, a heavy duty mechanical stirrer and an apparatus for supplying these aqueous solutions are required. With respect to heavy duty mechanical stirrer 5, any impeller for low viscosity liquid described in "Kagaku Kogaku Binran", pp. 887-920 (published by Maruzen Co., Ltd., 5th edition, 1988) can be used; it is recommended to use a driving system allowing high speed rotation. For vigorous stirring, disc turbines with great power consumption per unit volume of circulatory flow and flat impellers are preferred. As for the solution supplying apparatus, the feed piping is preferably equipped with the back flow preventing valve for prevention of back flow of the supplied solutions; it is more preferable to use the supply nozzle described in Japanese Patent O.P.I. Publication Nos. 67535/1984 and 160127/1987. Also, it is very preferable from the viewpoint of uniform and rapid mixing to supply a single solution in two or more portions as described in Japanese Patent O.P.I. Publication No. 160128/1987. Although the position of addition may be any one shown in FIGS. 2 and 4, it is preferable to locate it as close to heavy duty mechanical stirrer 5 as possible. Also, a commonly known method may be used to control the solution supply system; for example, such control can be achieved by determining flow rate using a flow meter, conducting feed back control with reference to the reference value and regulating the control valve or pump to produce controlled output. For more strict control, the apparatus described in Japanese Patent Application Nos. 310263/1990 and 310269/1990 are recommended.

Supply of precipitate

As shown in FIGS. 2 and 4, the precipitation reaction phase solution and the crystal growth phase solution in the mixing vessel are mutually isolated by the back flow preventing valve, but they must be rapidly mixed by the means of stirring provided on the crystal growth phase solution side.

Also, like the supply of component solutions to the mixing vessel, it is very effective to supply the precipitate separately at two or more sites, since it enhances rapid stirring.

Diaphragm-incorporating relay valves etc. can be used as the back flow preventing valve.

Means of reactor stirring

The means of stirring must be located very close to the site of supply of the precipitate. Also, in the case of circulatory systems as shown in FIGS. 3 and 4, it is also preferable to locate the means of stirring immediately before the supply site of the precipitate, since stirring action is enhanced by turbulent mixing. Although the mechanical stirrer may be selected from those exemplified for the mixing vessel, it is preferable to use a disc turbine with great power consumption per unit volume of circulatory flow and a flat impeller to stir the solutions, provided that the solutions are circulated using a pump in the case of the circulatory type. The pump may be located before or after the fine grain mixing site or immediately before the means of stirring.

As for precipitation reaction conditions (i.e., conditions in the mixing vessel), the precipitation reaction may be carried out using high molecular gelatin as a protective colloid, as specifically described in Term IX, Research Disclosure No. 17643 (December 1978). Temperature during fine grain formation is normally under 60° C., preferably under 50° C., and more preferably under 40° C.

For forming smaller grains of silver halide, a method is available in which silver halide grains are formed at lower temperature. Lower temperatures result in reduction in the solubility of silver halide grains even when the pAg level remains constant, thus yielding finer core grains.

It is also possible to form and maintain an emulsion at still lower temperature, whereby the progress of Ostwald ripening of fine grains can be further inhibited. However, at temperatures of under 35° C., ordinary gelatin is apt to gelate, it is possible to use a low molecular gelatin, a synthetic high polymer compound having a protective colloid effect to silver halide grains or a natural high molecular compound of non-gelatin type in combination with the aqueous solution of protective colloid described above.

The silver halide may comprise a single silver halide composition or a combination of two or more silver halide compositions.

Methods of silver halide grain size reduction include the method described in Japanese Patent Application No. 314893/1990, wherein an aqueous solution of protective colloid with a given ratio of high molecular and low molecular gelatins is used to form silver halide grains in the presence of protective colloid at low temperature, the method described in Japanese Patent Application No. 314892/1990, wherein a thickening agent is used to obtain a high viscosity of a few dozen cp to thereby reduce the diffusion speed during nucleation, to yield fine grains, and the method described in Japanese Patent Application No. 314894/1990, wherein an inorganic salt such as sodium nitrate, guanidine salt of acid or sodium citrate or an organic gelatin peptizer is added to protective colloid gelatin, to form fine crystals under conditions causing no gelation of gelatin even at low temperature and with increased viscosity.

It is necessary to suppress the formation of reduced silver cores in the fine crystals themselves formed upon crystal formation to suppress fogging in the grown grains; for this reason, it is preferable to keep pAg and pH levels as specified in Japanese Patent Application No. 314890/1990 during mixing to form silver halide grains.

The silver halide grains to be grown according to the present invention may be obtained by any of the acidic method, the neutral method and the ammoniacal method. The silver halide grains produced by such a method may be of a single composition of silver bromide, silver iodobromide, silver iodochloride or silver chloride, and may be of two or more compositions. These silver halides may be coarse or fine in grain size and may be narrow or broad in grain size distribution. The crystal shapes of these silver halides may be normal, such as cubic or octahedral, or irregular, such as spherical or tabular, or a complex thereof. They may also comprise various crystal shapes. The crystalline structure of these silver halide grains may be uniform from inside to outside or may be irregular in that the inside and outside have different compositions. These silver halide grains may also be of the surface latent image type or the internal latent image type. During growth of the silver halide grains, a known silver halide solvent such as ammonia, thioether or thiourea may be present. The silver halide grains may be supplemented with at least one kind of metal ion selected from the group comprising cadmium salts, zinc salts, lead salts, thallium salts, iridium salts (including complex salts), rhodium salts (including complex salts) and iron salts to contain these metal ions in and/or on the grains. Also, reduction-sensitization specks can be provided in and-/or on the grains by bringing the grains in an appropriate reducing atmosphere.

The present invention has made it possible to achieve uniform growth of silver halide grains free of the problems of growth of silver halide grains at the portions of uneven distribution of silver ion and halide ion concentrations in conventional production methods and apparatuses, and thus-resulting emulsion grains involving unevenness of, e.g., grain size, crystal phase, intergranular and intragranular halogen distributions.

Surprisingly, it was found that reduced silver specks formed in the fine grains themselves under some pAg and pH conditions can affect the grown grains even in the method wherein silver halide grains are added. It has become possible to supply fine grains free of reduced silver specks by appropriately setting mixing conditions to thereby form highly sensitive silver halide grains which cannot be obtained by conventional methods.

Commonly known methods of forming silver sulfide include reaction of hydrogen sulfide and silver nitrate, reaction of sodium sulfide and silver nitrate, and reaction of sodium thiosulfate and silver nitrate.

Selenium and tellurium, which are known to have a sensitizing effect, and mixtures thereof, can be used in place of sulfur; all these substances make it possible to obtain useful fine grains by the use of the method of the present invention. Although any substance can be used as a cationic component of the reaction reagent used for the present invention, as long as it forms a silver salt solution, it is the common practice to use an aqueous solution of silver nitrate. For an aqueous solution of gold salt, chloroauric acid, gold dimethylrhodanine or, where necessary, a mixture of chloroauric acid and rhodan ammon, may be used. Examples of substances for aqueous solutions of sulfide for the anionic component include thiourea, thiourea derivatives, rhodanines, oxazolidines, polysulfides, selenoureas and dithiacarbaminic acids, as well as those mentioned above.

To suppress the flocculation and growth of fine grains of silver sulfide, i.e., to achieve stable dispersion, it is preferable to use a protective colloid as in the production of photographic emulsion grains.

Protective colloid concentration is normally not less than 1% by weight, preferably not less than 2% by weight. As protective colloids, gelatin and other synthetic polymers can be used; examples are described in Term IX of Research Disclosure 176 No. 17643 (December 1978).

Temperature at which the above fine grains are formed is a factor determining the grain growth speed and the number of specks formed, both described later; usually, the grain growth speed increases as temperature rises. Therefore, for obtaining fine grains, temperature is preferably under 80° C., more preferably under 60° C., and still more preferably under 40° C. At temperatures of under 35° C., it is preferable to use low molecular gelatin with a molecular weight of not more than 30000 because ordinary gelatin is likely to gelate at these temperatures; for example, the method described in Japanese Patent Application No. 314893/1990, which uses a mixture of high molecular gelatin and low molecular gelatin, is also preferred. For the purpose of reducing the settability, salt and acid may be used.

As to the other parameters of fine grain formation, pH and ion concentration are important in regulating the solubility of said fine grains. These parameters determine the speed of grain growth and the number of nuclei formed.

For example, when using hydrogen sulfide and silver nitrate, pH may be changed to control hydrogen sulfide dissociation, and silver ion concentration may be changed to control the silver ion content in the solution.

A uniform grain size can be obtained by the method of preparing silver halide described in British Patent No. 1,535,016 and Japanese Patent Examined Publication Nos. 36890/1973 and 16364/1977, wherein the rate of addition of the reaction solution is changed according to the speed of grain growth, or the method described in U.S. Pat. No. 4,242,445 and Japanese Patent O.P.I. Publication No. 158124/1980, wherein grains are grown at a speed not exceeding the critical speed of grain growth by changing the reaction solution concentration.

Although the size of the fine grains of sulfide obtained by the present invention is optionally controlled, it is generally known that fogging occurs when the size is too large; the size is preferably not more than 100 Å, more preferable not more than 60 Å.

By mixing the fine grains of silver sulfide, gold-silver sulfide or gold sulfide obtained in the manner described above with fine grains of silver halide, a chemical sensitizing effect is obtained. As for treating conditions for this chemical sensitization, it can be carried out at ordinary temperatures, though the conditions cannot be determined absolutely, depending on the adsorption conditions for the sensitizing dyes used in combination in the light-sensitive material for use in color photography, and on whether or not it is necessary to limit the sites where the fine grains are adsorbed. When using a sensitizing dye, it may be added at any time, whether before, after or, if necessary, simultaneously with addition of the fine grains. Limitation of sites may be performed after the silver halide has been coated with an adsorbent; a sensitizing dye is suitable for this purpose, but other adsorbents, such as azaindenes and heterocyclic compounds having a mercapto group, are also effective. This site limitation can also be achieved by the use of a solvent for silver halide. Examples of such solvents include thiocyanic acids, thioether and telluroether, with preference given to KSCN, NH$_4$SCN, etc. Although these additives may be added before, after or simultaneously with addition of the fine grains, it is preferable to add them before the fine grains are added. As for how to supply the fine grains to silver halide, they may be added instantaneously or gradually over a long period.

EXAMPLES

Formation of silver sulfide

Comparative Example A1

| Solution A: | Sodium sulfide monohydrate 0.2 mol/l solution | 1000 cc |
|---|---|---|
| Solution B: | Silver nitrate 0.4 mol/l solution | 1000 cc |
| Solution C: | Ossein gelatin, diluted with distilled water to make a total quantity of | 2000 cc. |

Figure 7:
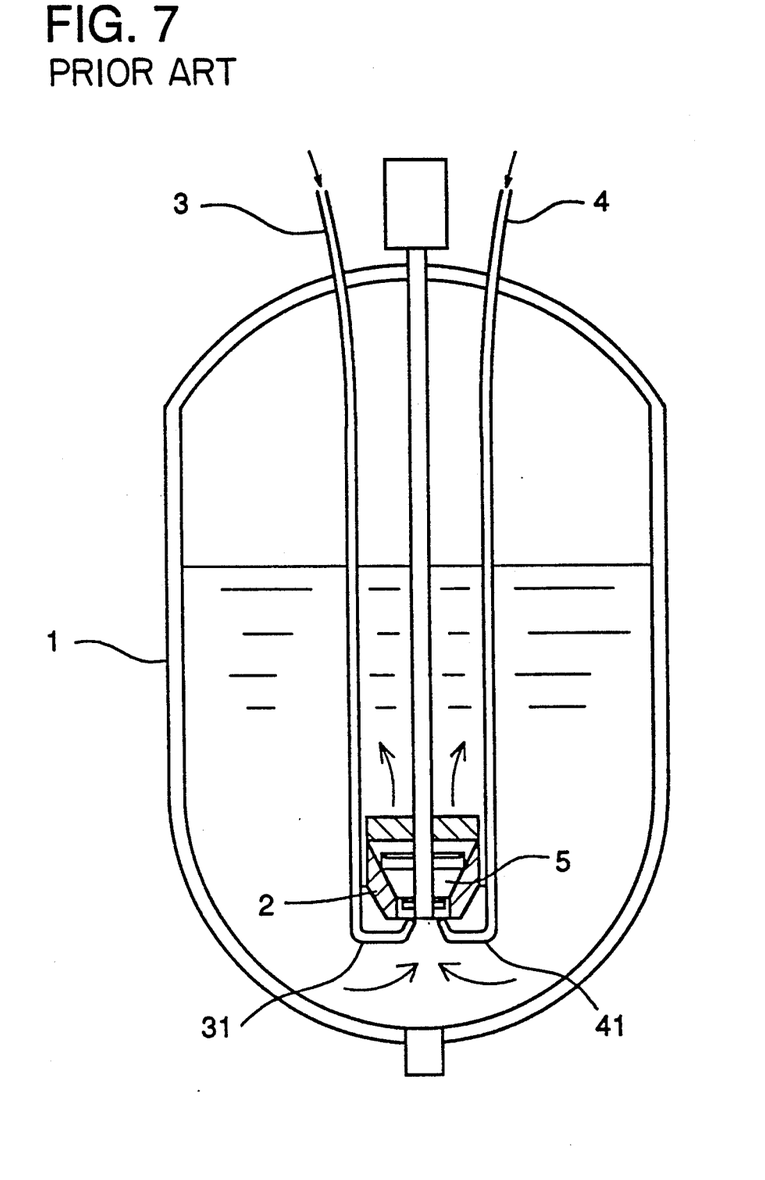
FIG. 7 is a schematic diagram of another conventional production apparatus.

The gelatin used was ossein gelatin.
The reaction apparatus used was of the type of FIG. 7. Solution C was added to the reactor and stirred at constantly 35° C. at a stirring rotation rate of 650 rpm. Then, solutions A and B were simultaneously supplied to the reactor over a period of 40 minutes, while keeping the pH and silver potential at 7.5 and −100 mV, respectively.

Comparative Example A2

The same solutions as in Comparative Example A1 were prepared. Another solution D was also prepared.

| Solution D: | Ossein gelatin | 50 g |
|---|---|---|
| | Distilled water was added to make a total quantity of | 1000 cc. |

The production apparatus shown in FIG. 6 was used, with the rate of rotation of the mechanical stirrer of the mixing vessel set at 4500 rpm.
Solution D was added to the reactor equipped with the mechanical stirrer and stirred at constantly 35° C. at a stirring rotation rate of 400 rpm. Then, solutions A, B and C were simultaneously supplied to the mixing vessel over a period of 40 minutes, while keeping the pH and silver potential in the reactor at 7.5 and −100 mV, respectively.

EXAMPLE A1

The same solutions as in Comparative Example A2 were prepared. The production apparatus used was of the type of FIG. 1 and was operated in the same manner as in Comparative Example A2. To obtain a clear difference from Comparative Examples, the same mechanical stirrer of the mixing vessel as in Comparative Example A2 was used, but the rate of rotation was set at 4300 rpm, at which rate equal grain sizes of fine grains of precipitate are obtained under the same conditions of component solution supply rate and temperature despite the slight difference in the inside shape of reactor.

The fine grains of silver sulfide thus formed can be evaluated by transmission electron microscopy. Specifically, after grain formation, silver sulfide grains were sampled from the reactor and treated to remove the excess salts, after which the sample was dripped over a meshed plate for transmission electron microscopy. After drying, the sample was observed.
The results are shown in Table 2.
Table 2

TABLE 2

| | Average grain size (Å) | Coefficient of variance (%) |
|---|---|---|
| Comparative Example A1 | 78 | 10.5 |
| Comparative Example A2 | 75 | 21.5 |
| Example A1 | 77 | 10.7 |

As is evident from the results shown in Table 2, the present invention allows fine grain production in exactly the same time as with the double jet method in Comparative Example A1, offering a very uniform grain size distribution. The broadness of the grain size distribution in Comparative Example A2 is attributed to the growth in piping of the fine grains formed in the mixing vessel. Examples of formation of silver halide grains The method of producing silver halide grains of the present invention is hereinafter described in detail by means of the following examples.

Silver iodobromide seed emulsion Em1

A silver halide seed emulsion, Em1, was prepared by mixing an aqueous solution of 4N silver nitrate and another aqueous solution containing 3.96N potassium bromide and 0.04N potassium iodide in a 40° C.-heated aqueous solution of 2.0% by weight gelatin by the control double jet method as directed in Japanese Patent O.P.I. Publication No. 45437/1975. Electron microscopy revealed that Em1 comprised monodispersed grains having an average grain size of 0.8 μm and a coefficient of variance of 10%.

Figure 8A:
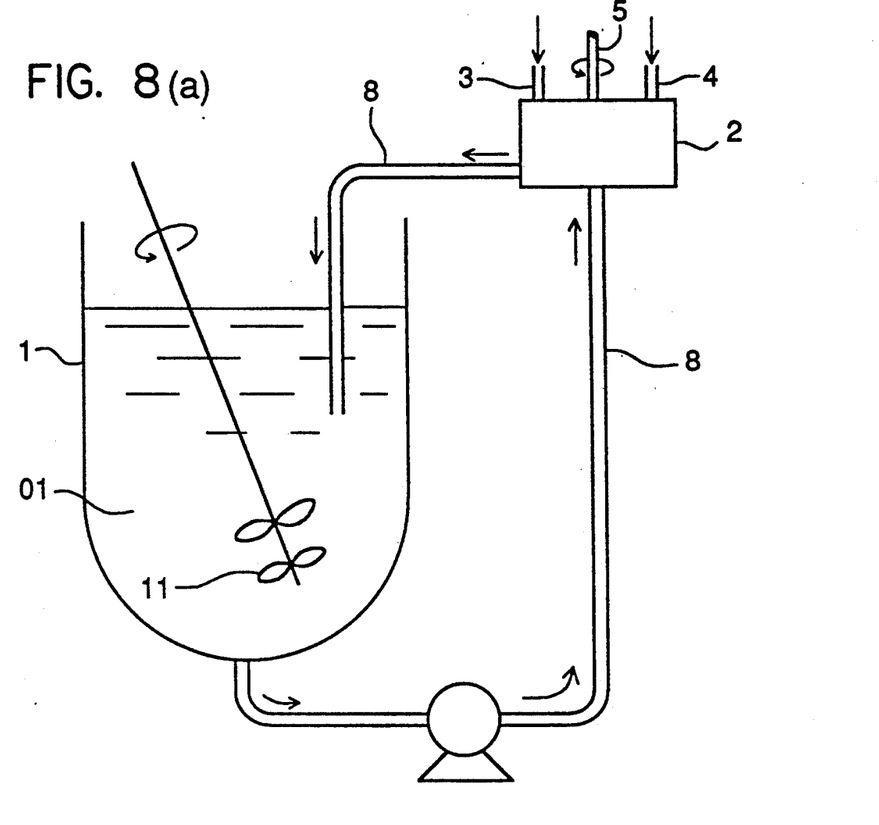
FIG. 8 is cross-sectional views of a production apparatus and mixing vessel used in examples of the present invention.
Figure 8B:
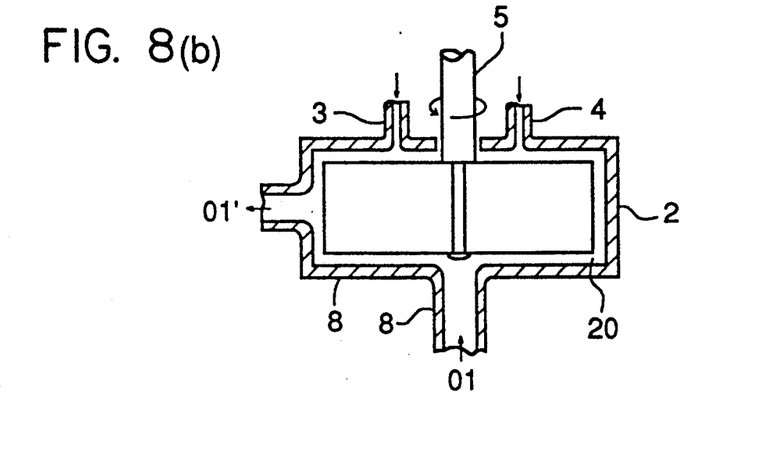

Using the apparatus illustrated in FIG. 8, of the circulation type selected to clarify the utility of the present invention and yield the same precipitate in the reaction chamber of the mixing vessel, an aqueous solution of 3 mol silver nitrate, a halide component solution containing 2.85 mol potassium bromide and 0.15 mol potassium iodide and an aqueous solution of 6% by weight gelatin were reacted to form a precipitate. The precipitate continuously formed in the reaction chamber was the fine grains having an average grain size of 0.01 μm. This grain size was confirmed by transmission electron microscopy on samples taken from the exit of the mixing vessel. The grain size in Example B1 is expected to smaller because the grains are instantaneously mixed in solution 01 circulated from the reactor. Solution 01 in the reactor is contained the above seed emulsion Em1 along with an aqueous solution of colloid previously. The conditions of solution 02 supply were set as follows.

In Comparative Examples, the reactor was stirred using propeller blades at 600 rpm in FIG. 8. Solution 02 was added over a period of 1 hour for Comparative Example B1 or 1 hour and 30 minutes for Comparative Example B2.

In Examples, the system shown in FIG. 3 was used, the reactor stirred under the same conditions as in Comparative Example B1. A mechanical stirrer equipped with a 4-blade paddle in the circulatory piping was used at a rotation rate of 1500 rpm. Solution 02 was added over a period of 1 hour for Example B1 or 1 hour and 30 minutes for Example B2.

The results are shown in Table 3.

|  | Average grain size ($\mu$m) | Coefficient of variance (%) |
| --- | --- | --- |
| Comparative Example B1 | 1.57 | 20.7 |
| Comparative Example b2 | 1.60 | 18.5 |
| Example B1 | 1.64 | 8.5 |
| Example B2 | 1.65 | 8.2 |

These results demonstrate that the samples obtained according to the production method of the present invention yielded grains having greater average size and markedly uniform size distribution in comparison with Comparative Examples.

The present invention allows formation of monodispersed grains of sparingly water-soluble salt crystal with uniform intracrystalline conditions and optionally selected size in a short time.

What is claimed is:

1. An apparatus for producing sparingly water-soluble salt crystal grains, comprising:
   a reaction chamber having a stirring member and being capable of receiving a crystal growth process solution including a protective colloid substance in which at least one of a crystal core formation process and a crystal growth process can take place;
   a mixing vessel having openings through which a cationic component solution and an anionic component solution can be separately introduced into said mixing vessel and a stirring member for mixing said component solutions to form a precipitation process solution in which sparingly water-soluble salt grains are produced;
   a one-way valve connecting said mixing vessel to said reaction chamber while preventing a reverse flow from said reaction chamber to said mixing vessel, wherein one side of said one-way valve is filled with said precipitation process solution and the other side is filled with said crystal growth process solution and said precipitation process solution is injected into said crystal growth process solution through said one-way valve immediately after said component solutions are mixed while said crystal growth process solution is stirred.

2. The apparatus of claim 1, wherein said mixing vessel is mounted on said reaction chamber.

3. The apparatus of claim 2, wherein said mixing vessel is mounted at the lower portion of said reaction chamber.

4. The apparatus of claim 2, wherein said mixing vessel comprises a partition member disposed between the precipitation process solution and the crystal growth process solution and said one-way valve is provided on said partition member.

5. The apparatus of claim 2, wherein said stirring member of said reaction chamber is disposed in the vicinity of said mixing vessel.

6. The apparatus of claim 5, wherein said stirring member of said reaction chamber is disposed in the vicinity of said one-way valve.

7. The apparatus of claim 1, wherein the injection of said precipitation process solution into said crystal growth process solution is carried out more than once and is done intermittently.

8. An apparatus for producing sparingly water-soluble salt crystal grains, comprising:
   a reaction chamber having a stirring member and being capable of receiving a crystal growth process solution including a protective colloid substance in which at least one of a crystal core formation process a and crystal growth process can take place;
   circulating means, including a circulating pipe line, positioned outside of said reaction chamber, for circulating said crystal growth process solution from and to said reaction chamber;
   a mixing vessel having openings through which a cationic component solution and an anionic component solution can be separately introduced into said mixing vessel and a stirring member for mixing said component solutions to form a precipitation process solution in which sparingly water-soluble salt grains are produced, said mixing vessel disposed in the vicinity of said circulating line; and
   a one-way valve connecting said mixing vessel to said pipe line while preventing a reverse flow from said pipe line to said mixing vessel, wherein one side of said one-way valve is filled with said precipitation process solution and the other side is filled with said crystal growth process solution and said precipitation process solution is injected into said crystal growth process solution through said one-way valve immediately after said component solutions are mixed while said crystal growth process solution is circulated.

9. The apparatus of claim 7, wherein said mixing vessel is mounted on said circulating pipe line.

10. The apparatus of claim 9, wherein said mixing vessel comprises a partition member disposed between the precipitation process solution and the crystal growth process solution and said one-way valve is provided on said partition member.

* * * * *

UNITED STATES PATENT AND TRADEMARK OFFICE
CERTIFICATE OF CORRECTION

PATENT NO. : 5,334,359
DATED : August 02, 1994
INVENTOR(S) : Haruhiko Masutomi et al.

It is certified that error appears in the above-indentified patent and that said Letters Patent is hereby corrected as shown below:

Claim 8, column 16, line 29, change "a and" to --and a--.

Claim 9, column 16, line 53, change "claim 7" to --claim 8--.

Signed and Sealed this

Twenty-fifth Day of April, 1995

Attest:

BRUCE LEHMAN

Attesting Officer        Commissioner of Patents and Trademarks